United States Patent
Wu

(10) Patent No.: US 7,306,247 B2
(45) Date of Patent: Dec. 11, 2007

(54) SUSPENSION STRUCTURE FOR AN ELECTRIC WHEELCHAIR

(75) Inventor: Donald P. H. Wu, Hsin-Feng Hsiang (TW)

(73) Assignee: Pihsiang Machinery Mfg. Co., Taichung (TW)

( * ) Notice: Subject to any disclaimer, the term of this patent is extended or adjusted under 35 U.S.C. 154(b) by 355 days.

(21) Appl. No.: 11/194,859

(22) Filed: Aug. 1, 2005

(65) Prior Publication Data
US 2007/0023209 A1 Feb. 1, 2007

(51) Int. Cl.
*B60G 3/12* (2006.01)
(52) U.S. Cl. ............... 280/124.128; 280/124.1; 280/124.13; 180/907; 180/65.5
(58) Field of Classification Search ......... 280/124.128, 280/124.1, 124.13, 124.177, 124.178, 250.1; 180/65.5, 65.1, 907, 908
See application file for complete search history.

(56) References Cited

U.S. PATENT DOCUMENTS

| | | | | |
|---|---|---|---|---|
| 6,070,898 A | * | 6/2000 | Dickie et al. | 280/304.1 |
| 6,129,165 A | * | 10/2000 | Schaffner et al. | 180/65.1 |
| 6,776,430 B2 | * | 8/2004 | White et al. | 280/304.1 |
| 6,923,278 B2 | * | 8/2005 | Mulhern et al. | 180/65.1 |
| 7,150,463 B1 | * | 12/2006 | Liao | 280/124.128 |
| 2003/0168264 A1 | * | 9/2003 | Goertzen et al. | 180/65.1 |

* cited by examiner

*Primary Examiner*—Joe H. Cheng
*Assistant Examiner*—Jacob Meyer
(74) *Attorney, Agent, or Firm*—Banger Shia

(57) ABSTRACT

A suspension structure for an electric wheelchair comprises a frame, two cantilevers, two drive wheels, two rollers, four wheel-mounting assemblies, two front wheel assemblies, two draglines and two rear wheel assemblies. When surmounting a barrier, the front wheel assemblies will pivot upward and press down the drive wheels through the cantilevers, thus improving the road holding performance of the drive wheels. In other words, the drive wheels and the front wheels can move interactively to surmount the barrier.

1 Claim, 8 Drawing Sheets

SUSPENSION STRUCTURE FOR AN ELECTRIC WHEELCHAIR

BACKGROUND OF THE INVENTION

1. Field of the Invention

The present invention relates to a suspension structure for an electric wheelchair, and more particularly to a suspension structure for an electric wheelchair whose mid wheels serving as drive wheels.

2. Description of the Prior Art

An electric wheelchair is usually used by old age or handicapped people for helping them regain their mobility, and it can move successfully on a smooth road. However, the electric wheelchair will have difficult in getting through a barrier if it is not equipped with good suspension system, and it may have a risk of tipping over.

Referring to FIGS. 1 and 2, a conventional electric wheelchair disclosed by U.S. Pat. No. 6,640,916 is shown, at either side of the frame 10 is arranged a connecting member 11 pivoted to a drive rod 12, and the drive wheel 13 is fixed to the drive rod 12. The drive wheels 13 is driven by a motor 14, between the drive rod 12 and the frame 10 is arranged a first spring 15. At the front end of the frame 10 is arranged a pair of cantilevers 16 each have a guide wheel 161, and between the cantilevers 16 and the frame 10 is biased a second spring 17.

In the normal state, the guide wheels 161 are hung without touching the ground, so that when encountering a barrier, the guide wheels 161 will roller over it first, and then the drive wheel can climb up the barrier with its strong driving power.

Although it can overcome a barrier, the conventional wheelchair will consume too much power and cause uncomfortable shock, and the reasons are explained as follows:

First, when encountering a barrier, the drive wheels need to produce a strong driving power for pushing the guide wheel 161 and enabling it to climb up the barrier, however, generating a strong driving power will consume a lot of power.

Second, running on an uneven road, the drive wheels will always bounce up and down without firmly touching the ground, so that the electric wheelchair is unable to move forward stably and smoothly.

Second, when passing a barrier, the cantilevers and the drive rods will bounce up and down under the action of the first and second springs, this cause vibration and make the user feel uncomfortable.

The present invention has arisen to mitigate and/or obviate the afore-described disadvantages.

SUMMARY OF THE INVENTION

The primary objective of the present invention is to provide a suspension structure for an electric wheelchair, when encountering a barrier, the suspension structure of the present invention can make the front wheel assemblies while pressing the drive wheels downward, thus effectively minimizing the bounce of the drive wheels and making the electric wheelchair move smoothly, furthermore, the power consumption of the electric wheelchair of the present invention is greatly saved.

The secondary objective of the present invention is to provide a suspension structure for an electric wheelchair. The elastic buffering member of the wheel-mounting assemblies can provide a buffering force when the front wheel assemblies move upward and downward, preventing uncomfortable shock. Furthermore, since the drive wheels are pivoted to the frame by the cantilevers, plus the rollers, the draglines, the front wheel assemblies, and the elastic buffering member of the wheel-mounting assemblies can provide a buffering force when the drive wheels move upward and downward.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
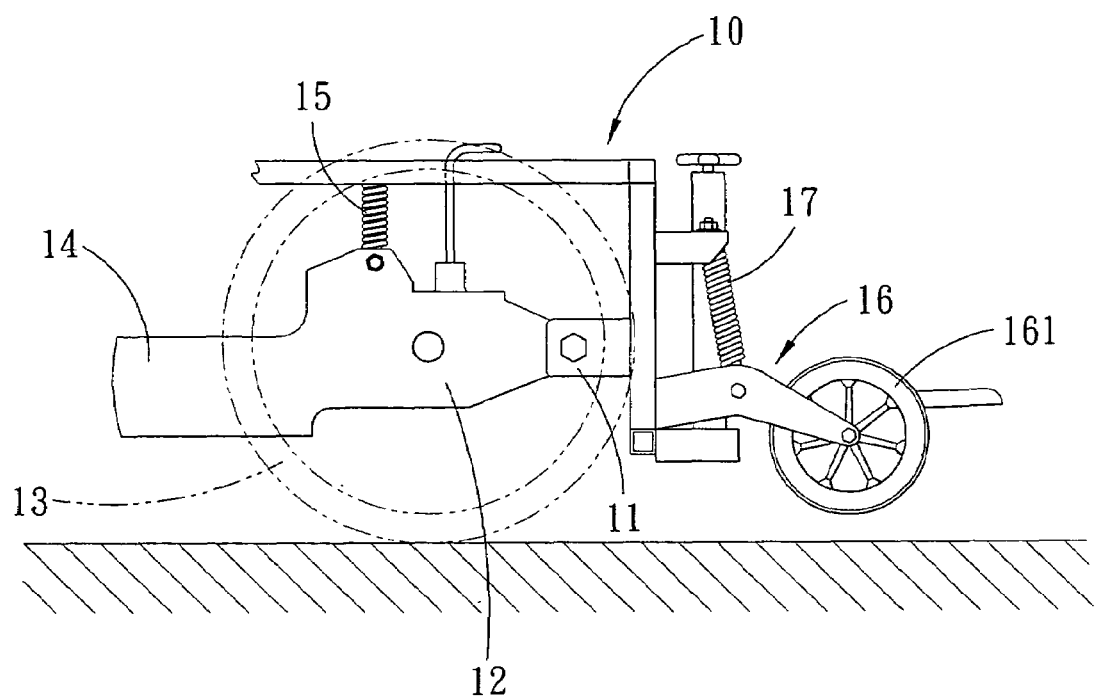
FIG. 1 is a structural illustrative view of showing a conventional electric wheelchair.
Figure 2:
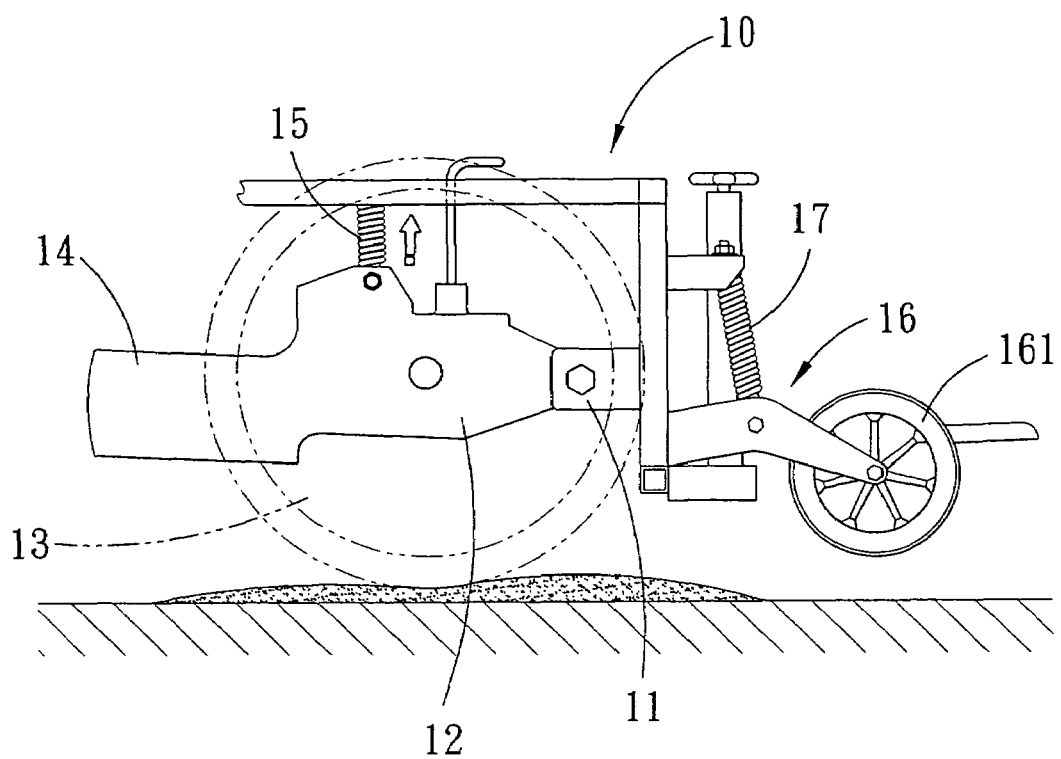
FIG. 2 is an illustrative view of showing that the conventional electric wheelchair is surmounting a barrier.
Figure 3:
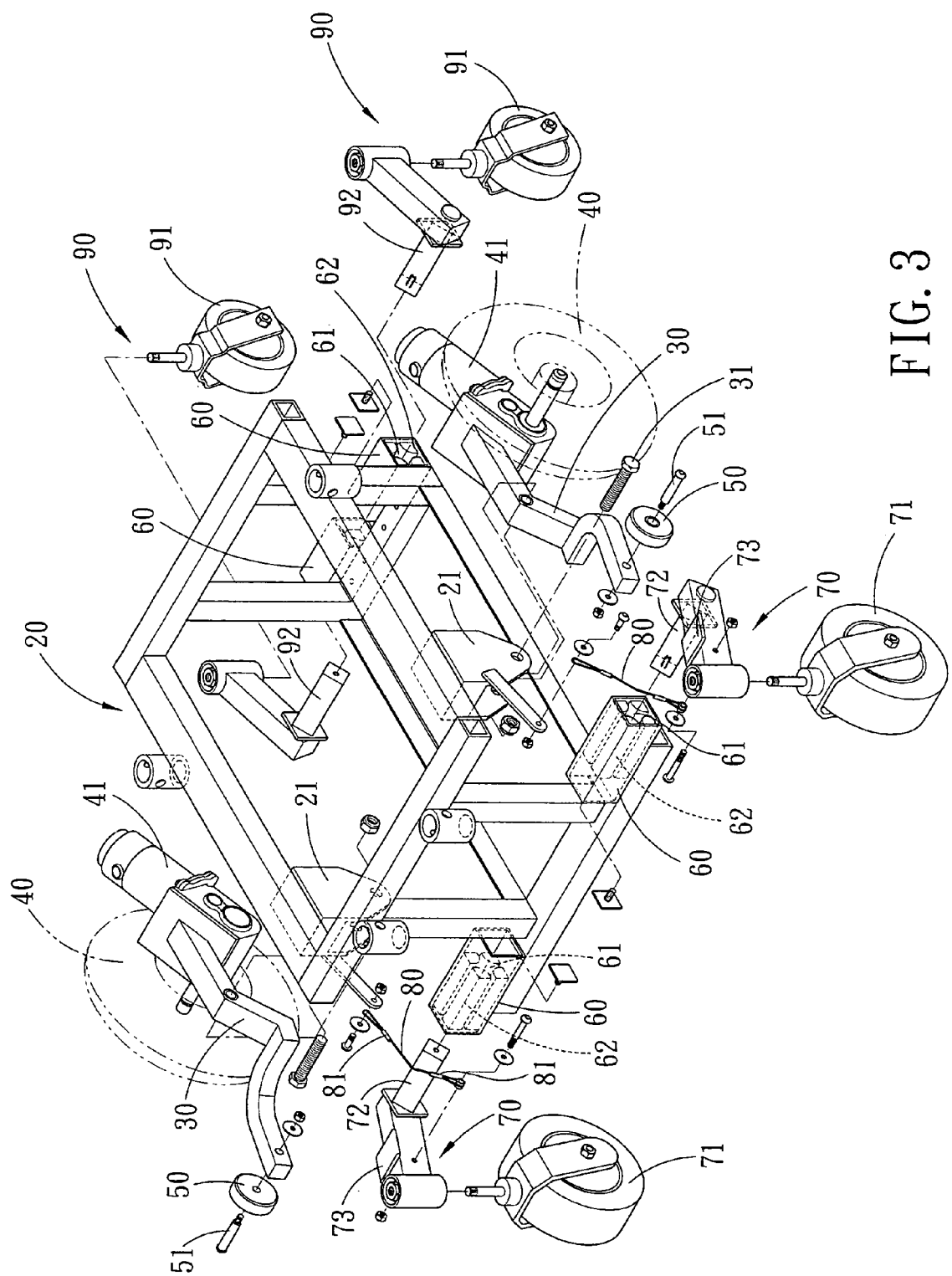
FIG. 3 is an exploded view of an electric wheelchair in accordance with the present invention.
Figure 4:
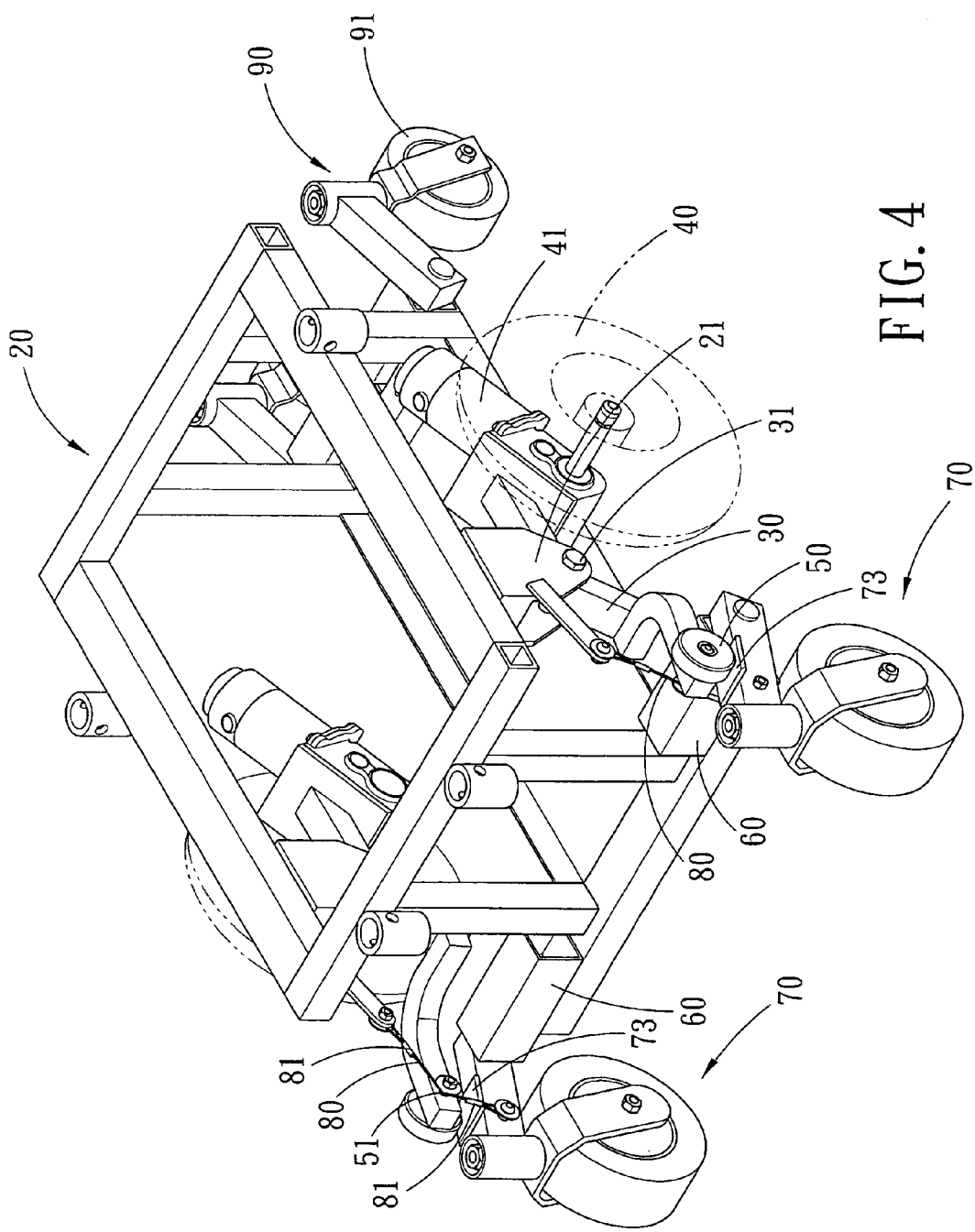
FIG. 4 is an assembly view of the electric wheelchair in accordance with the present invention.
Figure 5:
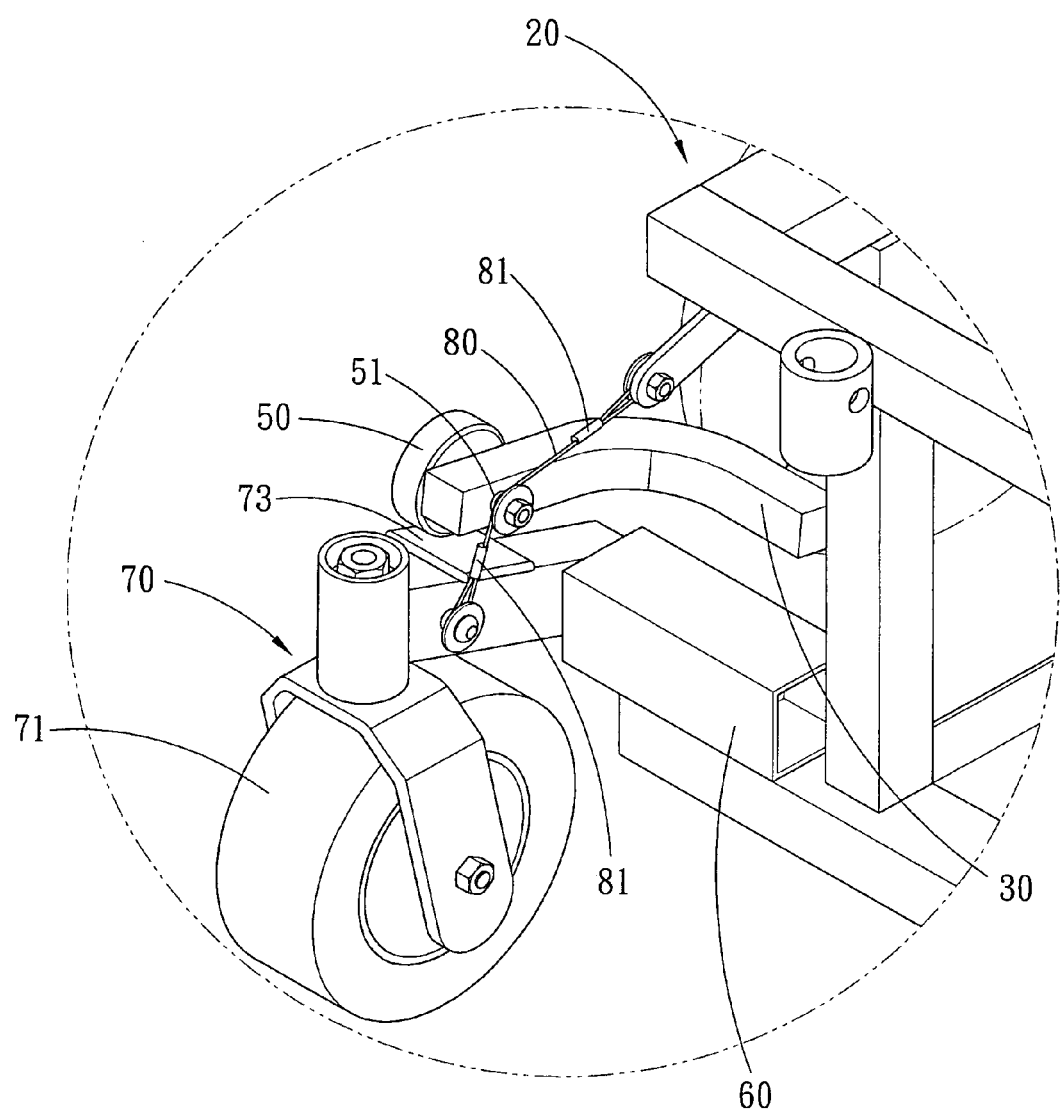
FIG. 5 is an enlarged view of a part of the electric wheelchair in accordance with the present invention.

Referring to FIGS. 3-6, a suspension structure for an electric wheelchair in accordance with the present invention comprises a frame 20, two cantilevers 30, two drive wheels 40, two rollers 50, four wheel-mounting assemblies 60, two front wheel assemblies 70, two draglines 80 and two rear wheel assemblies 90.

The frame 20 has a pair of ears 21 located at either side of the front portion thereof.

The respective cantilevers 30 have a mid portion pivoted to the pair of ears 21 of the frame 20, so that the cantilevers 30 can swing about the pivotal point 31.

The two drive wheels 40 are pivoted to the rear portion of the respective cantilevers 30 and are rotated by a motor 41. By the way, the drive wheels 40 can be located at the center of gravity of the wheelchair and the user, very close to the center of the electric wheelchair.

The two rollers 50 are fixed pivotally to the outer side of the front end of the respective cantilevers 30 by a pin 51.

The four wheel-mounting assemblies 60 are arranged in pairs and located at either side of the front and rear ends of the bottom of the frame 20. Each of the four wheel-mounting assemblies 60 is a tubular member having a central hole 61 whose inner periphery provided with elastic buffering member 62. The elastic buffering member 62 can be made of rubber.

The front wheel assemblies 70 each is provided at an end thereof with a 360° rotatable front wheel 71 and is provided at another end thereof with a laterally extending rod 72 to be inserted in the central hole 61 of the respective wheel-mounting assemblies 60, so that the respective front wheel assemblies 70 is pivotable about the wheel-mounting assemblies 60, using the extending rod 72 as a pivotal axis. At the mid portion of the respective front wheel assemblies 70 is disposed an abutting surface 73 for abutting against the rollers 50.

Each of the draglines 80 abuts against the pin 51 at the front end of the cantilevers 30 and is provided with two blocks 81 located at either side of the pin 51. Two ends of the respective draglines 80 are pivoted to the frame 20 and the front wheel assemblies 70, respectively.

The rear wheel assemblies 90 each is provided at an end thereof with a 360° rotatable rear wheel 91 and is provided at another end thereof with a laterally extending rod 92 to be inserted in the central hole 61 of the respective wheel-mounting assemblies 60, so that the respective rear wheel assemblies 90 is pivotable about the wheel-mounting assemblies 60, using the extending rod 92 as a pivotal axis.

Figure 6:
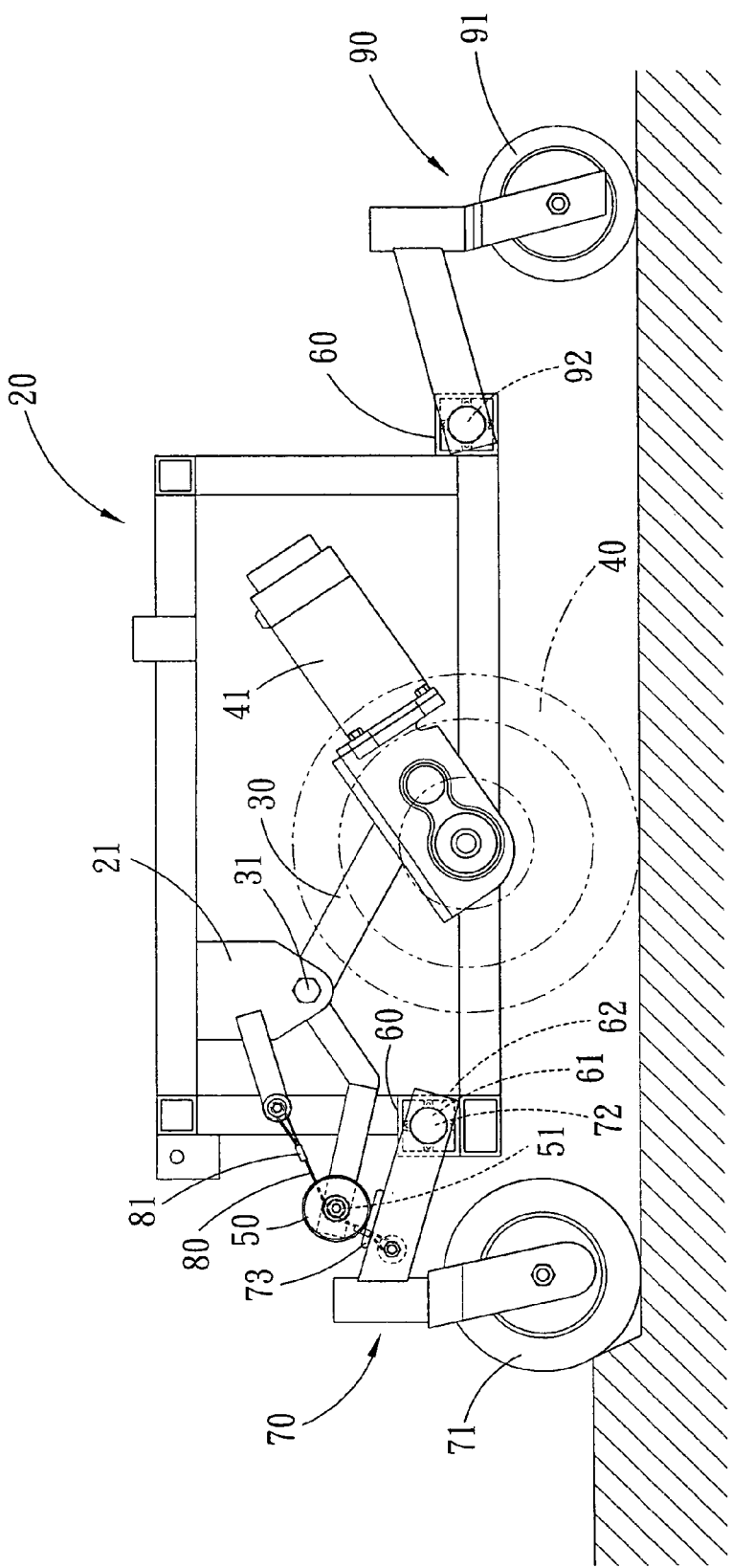
FIG. 6 is a side view of the electric wheelchair in accordance with the present invention.

Referring to FIG. 6, when running on a flat road, the weight of the user and the wheelchair are distributed over the two drive wheels 40, thus increasing the road holding performance of the drive wheels 40.

Figure 7:
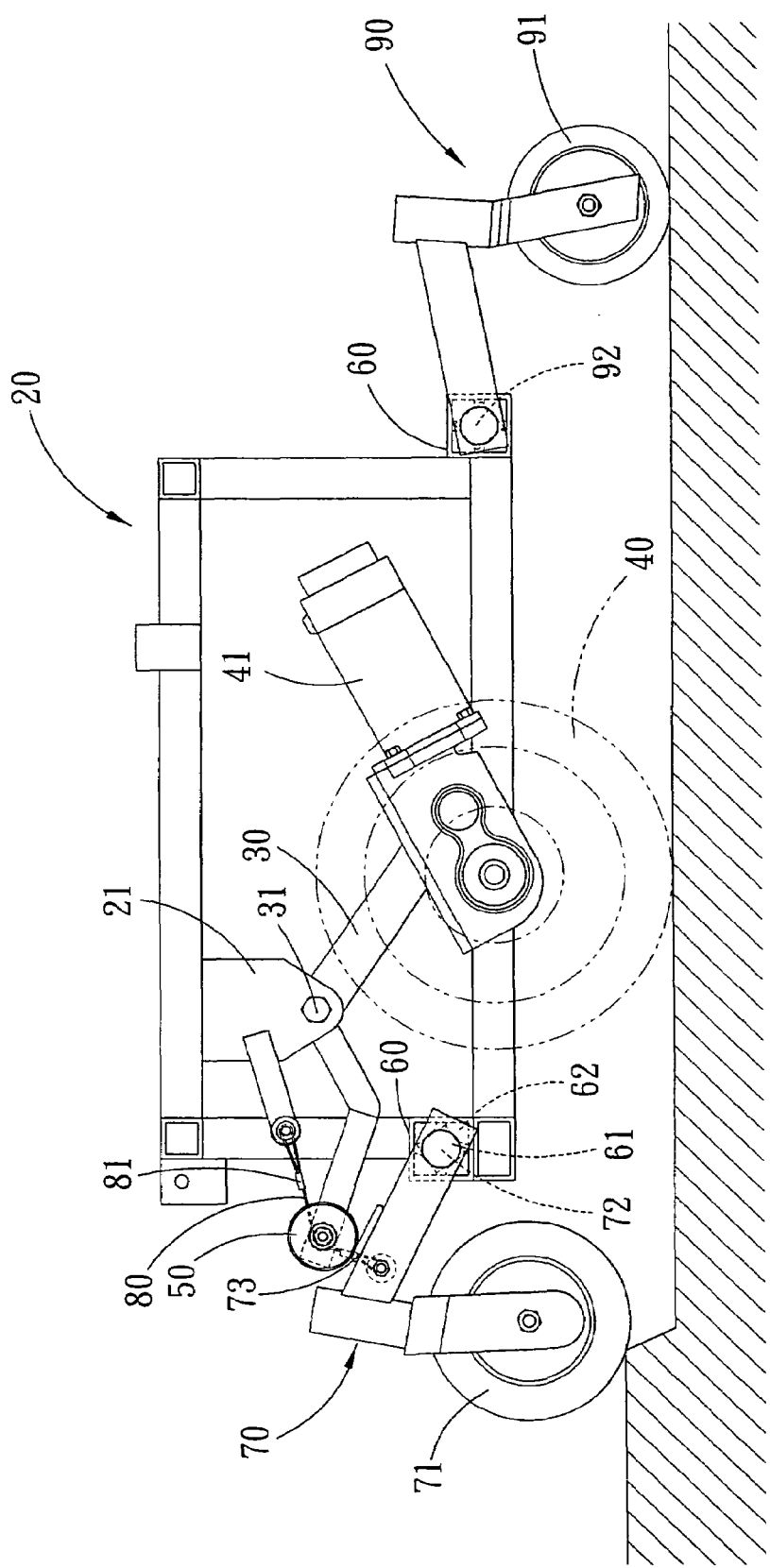
FIG. 7 is a side view of showing that the front wheel assemblies of the electric wheelchair in accordance with the present invention are surmounting a barrier.
Figure 8:
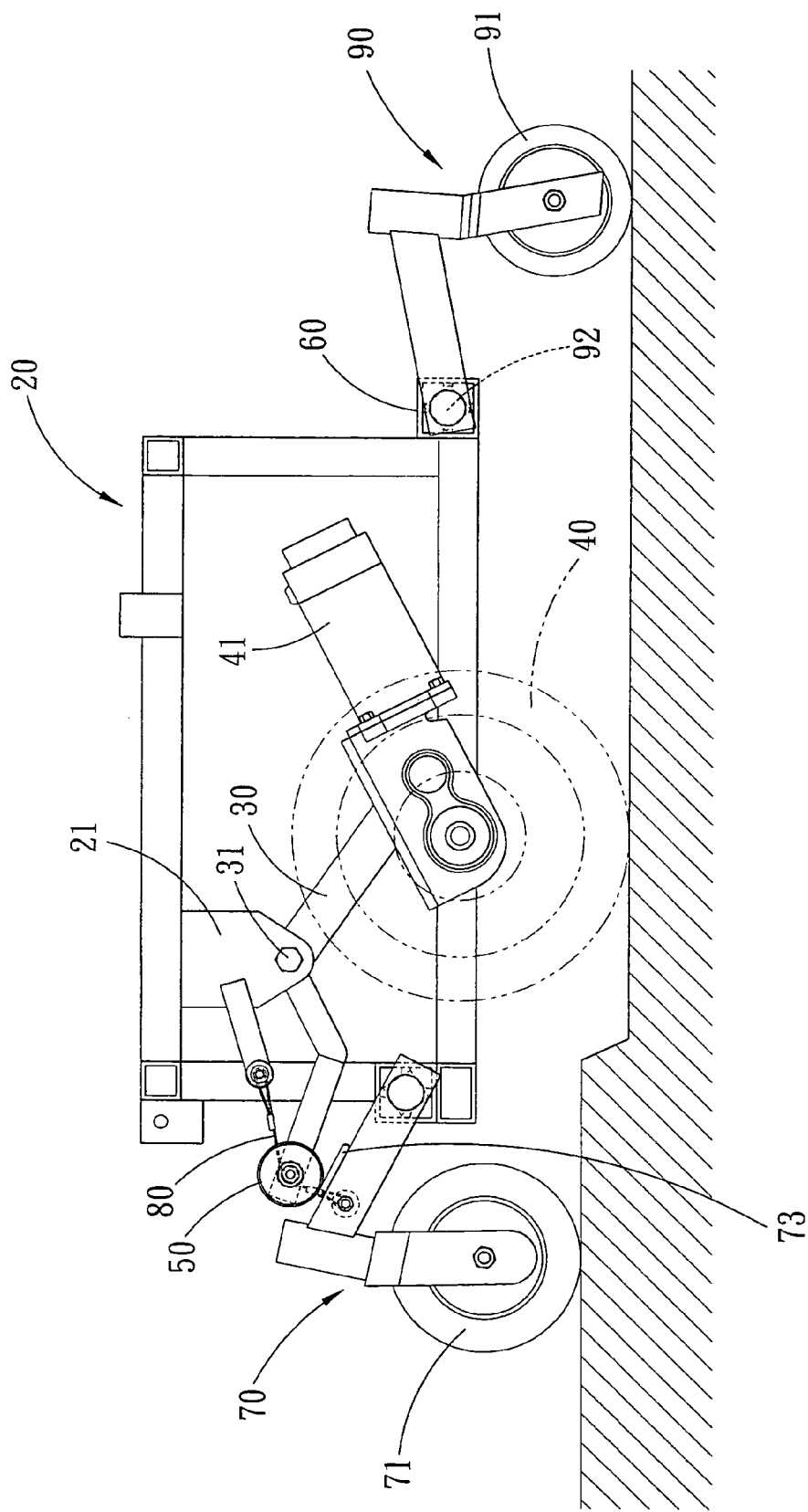
FIG. 8 is another side view of showing that the front wheel assemblies of the electric wheelchair in accordance with the present invention are surmounting a barrier.

When encountering a barrier (such as a threshold), the two front wheels 71 will be blocked by the barrier initially (as shown in FIG. 6), and then under the effect of the driving force of the drive wheels 40, the front wheel assemblies 70 will start to pivot upward relative to the wheel-mounting assemblies 60 (as shown in FIG. 7). Meanwhile, the abutting surface 73 of the front wheel assemblies 70 will push the front end of the cantilevers 30 upward, and due to the cantilevers 30 are pivoted to the ears 21 of the frame 20, the rear end of the cantilevers 30 will move downward. Consequently, the drive wheels 40 at the rear end of the cantilevers 30 will be pressed toward the ground, improving the griping force of the drive wheels 40. When the front wheel assemblies 70 reach a position higher than the barrier, the electric wheelchair is allowed to get across the barrier successfully (as shown in FIG. 8).

In other words, when encountering a barrier, the suspension structure of the present invention can make the front wheel assemblies 70 while pressing the drive wheels 40 downward, thus effectively minimizing the bounce of the drive wheels 40 and making the electric wheelchair move smoothly and stably. Through the upward movement of the front wheel assemblies 70 and the increase in the road holding performance of the drive wheels 40, the power consumption of the electric wheelchair of the present invention is greatly saved as compared to the conventional one.

It will be noted that, in normal state, the rollers 50, the wheel-mounting assemblies 60, the draglines 80 and the abutting surface 73 will cooperate together to keep the front wheel assemblies 70 touching the ground. When surmounting a barrier, the upward movement of the front wheel assemblies 70 is limited by the draglines 80 and the elasticity of the wheel-mounting assemblies 60, especially by the two blocks 81 located at either side of the pin 51. The elastic buffering member 62 of the wheel-mounting assemblies 60 can provide a buffering force when the front wheel assemblies 70 move upward and downward, preventing uncomfortable shock. Furthermore, since the drive wheels 40 are pivoted to the frame 20 by the cantilevers 30, plus the rollers 50, the draglines 80, the front wheel assemblies 70, and the elastic buffering member 62 of the wheel-mounting assemblies 60 can provide a buffering force when the drive wheels 40 move upward and downward, preventing uncomfortable shock caused by the excessive bounce of the drive wheels 40.

It is learned from the above descriptions that when surmounting a barrier, the front wheel assemblies 70 will pivot upward and press down the drive wheels 40 through the cantilevers 30, thus improving the road holding performance of the drive wheels 40. In other words, unlike the conventional electric wheelchair whose drive wheels and the front wheels move separately, the drive wheels and the front wheels of the present invention can move interactively to surmount the barrier, therefore, the power consumption of the electric wheelchair of the present invention is greatly saved as compared to the conventional one.

While we have shown and described various embodiments in accordance with the present invention, it should be clear to those skilled in the art that further embodiments may be made without departing from the scope of the present invention.

What is claimed is:

1. A suspension structure for an electric wheelchair comprising:

a frame having a pair of ears located at either side of a front portion thereof;

two cantilevers each having a mid portion pivoted to the respective ears of the frame, so that the cantilevers can swing with respective to the frame;

two drive wheels being pivoted to a rear end of the respective cantilevers and rotated by a motor;

two rollers fixed pivotally to an outer side of the front end of the respective cantilevers by a pin;

four wheel-mounting assemblies arranged in pairs and located at either side of the front and rear ends of the bottom of the frame, each of the four wheel-mounting assemblies is a tubular member having a central hole whose inner periphery provided with elastic buffering member;

two front wheel assemblies each provided at an end thereof with a rotatable front wheel and provided at another end thereof with a laterally extending rod to be inserted in the central hole of the respective wheel-mounting assemblies, at a mid portion of the respective front wheel assemblies being arranged an abutting surface for abutting against the rollers;

two draglines abutting against the pin at the front end of the cantilevers and being provided with two blocks located at either side of the pin, two ends of the respective draglines pivoted to the frame and the front wheel assemblies, respectively; and two rear wheel assemblies each provided at an end thereof with a rotatable front wheel and at another end thereof with a laterally extending rod to be inserted in the central hole of the respective wheel-mounting assemblies.

* * * * *